United States Patent [19]
Kato et al.

[11] Patent Number: 4,672,594
[45] Date of Patent: Jun. 9, 1987

[54] MAGNETO-OPTICAL RECORDING SYSTEM UTILIZING A LEAKAGE MAGNETIC FIELD OF FOCUSING ACTUATOR

[75] Inventors: Tsuyoshi Kato, Hachioji; Masahiro Ojima, Nerima; Toshio Niihara, Hachioji, all of Japan

[73] Assignee: Hitachi, Ltd., Tokyo, Japan

[21] Appl. No.: 701,165

[22] Filed: Feb. 13, 1985

[30] Foreign Application Priority Data

Feb. 15, 1984 [JP] Japan .................................. 59-25032

[51] Int. Cl.$^4$ .......................... G11B 5/02; G11B 11/10
[52] U.S. Cl. ........................................ 369/13; 369/45; 360/114; 365/121
[58] Field of Search ...................... 369/13, 14, 44, 45, 369/46; 360/59, 110, 114; 365/121, 122

[56] References Cited

FOREIGN PATENT DOCUMENTS 57-006444 1/1982 Japan ..................................... 369/45

Primary Examiner—Raymond F. Cardillo
Assistant Examiner—Hoa T. Nguyen
Attorney, Agent, or Firm—Antonelli, Terry & Wands

[57] ABSTRACT

In a magneto-optical file memory wherein a storage medium having a vertical magnetic film is irradiated with a laser beam to reverse a magnetization direction of the magnetic film, thereby to write and/or erase information, and a rotation of polarizable face of reflected light from the storage medium is detected, thereby to reproduce information; a magneto-optical file memory wherein a sense of a leakage magnetic field of an actuator which controls an optical system for condensing the laser beam on the storage medium is set to be the same as a sense of initial magnetization of the magnetic film of the storage medium.

5 Claims, 19 Drawing Figures

MAGNETO-OPTICAL RECORDING SYSTEM UTILIZING A LEAKAGE MAGNETIC FIELD OF FOCUSING ACTUATOR

BACKGROUND OF THE INVENTION

The present invention relates to magneto-optical file memories, and more particularly to a magneto-optical file memory capable of rewriting information.

As a rewritable magneto-optical file memory, there has been known a magneto-optical disk device wherein a storage medium having a vertical magnetic film is irradiated with a laser beam and has the direction of magnetization thereof reversed by the resulting absorption of photon energy, thereby to write and/or erase information, and the rotation of polarizable face of reflected light from the storage medium is detected, thereby to reproduce information (refer to, for example, Y. Togami et al, "Amorphous thin film disk for magneto-optical memory," SPIE, vol. 329, Optical Disk Technology (1982), pp. 208–214). For reversing the direction of magnetization in the device of this type, there are a writing form for Curie point and a writing form for compensatory temperature. Both of them make use of changes in the coercive force and magnetization of the storage medium based on temperatures. Here, the principles of operations for writing and erasing information will be described with reference to FIGS. 1 and 2 by taking the Curie-point writing system as an example.

FIG. 1 illustrates the principle of the writing operation. (a) shows unidirectional magnetization Ms before storage in a magnetic film. The state in which the magnetic film is magnetized in one direction in this manner is set as the state of initial magnetization. (b) shows that, when the surface of the magnetic film is irradiated with a laser beam 1 in the form of a spot, the minute part is heated to or above the temperature of the Curie point until the coercive force and the magnetization become null. (c) shows a state resulting when a magnetic field for writing Hb (about 100 Oe.) is applied to the state (b) in the direction opposite to that of the magnetization Ms. When the temperature has fallen, reversed magnetization arises owing to the sum between the writing magnetic field Hb and an opposite magnetic field Hd based on the magnetization Ms (actual magnetic field for writing = Hb + Hd). (d) shows a reversed magnetization state (written domain) stable in the cooled condition of the minute part (at the room temperature). The writing of information is performed in such sequence.

Next, the principle of the erasing operation is illustrated in FIG. 2. (a) shows the state (d) explained in FIG. 1. (b) shows the state (the same as (b) in FIG. 1) in which the written minute part is irradiated with a laser beam in the form of a spot and heated to or above the temperature of the Curie point. (c) shows a state resulting when a magnetic field for erasing $Hb_1$ (about 200 Oe.) is applied to the state (b) in the same direction as that of the magnetization Ms. At this time, the magnetization of the magnetic film has the same sense as that of the surrounding magnetization Ms owing to the difference between the erasing magnetic field $Hb_1$ and the opposite magnetic field Hd resisting it (actual magnetic field for erasing = $Hb_1$ − Hd). (d) shows the state of the magnetization Ms stable in the cooled condition of the minute part (at the room temperature). The erasing is performed in the above way.

As thus far described, information is written and erased by the magnetization reversal (of the surface) of the magnetic film of the storage medium. In this regard, in order to record or erase information precisely at the predetermined parts of the surface of the magnetic film, the so-called auto-focusing is required in which a laser beam spot as predetermined is projected on the surface of the magnetic film of the storage medium while following up the motion of the storage medium. To this end, an actuator for the fine adjustments of a lens is usually used.

With the prior-art magneto-optical file memory, however, the diameters of written domains become unequal, and an imperfect erased state is involved, resulting in the disadvantage that the writing, reproduction and erasing of information cannot be precisely conducted.

SUMMARY OF THE INVENTION

An object of the present invention is to eliminate the disadvantage of the prior-art magnetic file memory as stated above, and to provide a magnetic file memory capable of writing and erasing information precisely.

To the accomplishment of such object, the inventors have found out that the aforementioned disadvantage is attributed to the actuator, namely, that the written and erased states of information in the magnetic film of the storage medium are governed by the magnitude and direction of a leakage magnetic field from the actuator, and the present invention is characterized in that, in consideration of the influence of the leakage magnetic field of the actuator, the sense of the leakage magnetic field and the sense of the initial magnetization of the magnetic film of the storage medium are set to be identical.

DESCRIPTION OF THE PREFERRED EMBODIMENTS

Figure 1:
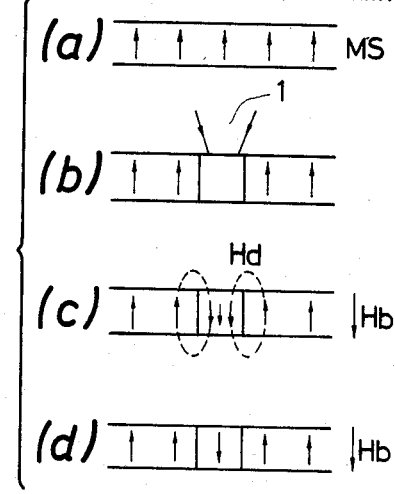
FIGS. 1(a–d) and 2(a–d) are diagrams illustrating conventional writing and erasing principles.
Figure 2:
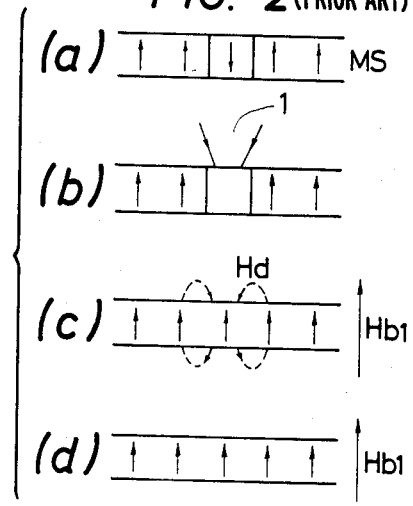
Figure 3:
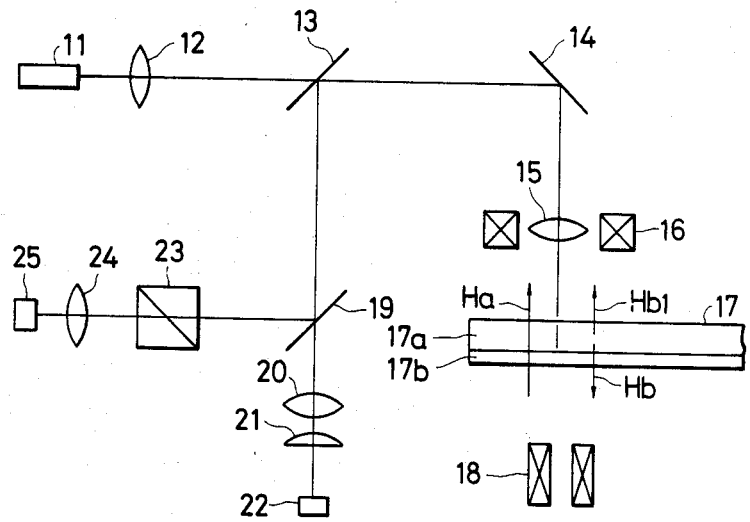
FIG. 3 is an arrangement diagram showing an embodiment of the present invention.

Now, one embodiment of the present invention will be described with reference to the drawings. FIG. 3 is a schematic arrangement diagram illustrative of the embodiment of a magneto-optical file memory according to the present invention.

Light emitted from a laser 11 is collimated into a parallel beam by a condensing lens 12. The light beam passing through a semitransparent mirror 13 and then reflected by a galvano-mirror 14 is projected in the form of a spot on a storage medium 17 by a focusing lens 15. The storage medium 17 consists of a transparent substrate 17a (for example, a glass substrate) and a magnetic film 17b (for example, an amorphous alloy film which is made of a rare-earth element such as Gd or Tb and a transition metal such as Fe or Co and which is about 1000 Å thick). The laser beam is condensed as the minute spot on the magnetic film 17b through the transparent substrate 17a. The lens 15 is assembled in an actuator 16 so that the condensed beam spot may track the motion of the storage medium 17.

Figure 4:
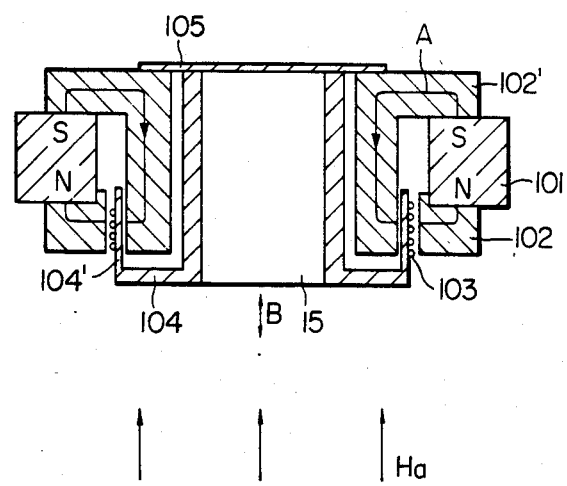
FIG. 4 is a sectional view showing an example of an actuator.

An example of the structure of the actuator is shown in FIG. 4. Referring to the figure, first and second stationary yokes 102 and 102′ are coupled to a permanent magnet 101, to construct a magnetic circuit which forms a closed magnetic path as indicated by arrows A. The arm 104′ of a movable holder 104 for holding the focusing lens 15 is inserted in the gap between the first and second stationary yokes 102 and 102′. A coil 103 is wound round the arm 104′ of the movable holder, and this movable holder is moved in the direction of an arrow B by causing current to flow through the coil 103. In addition, the movable holder 104 is supported on the stationary yokes 102 and 102′ by a leaf spring 105. In the construction, the position of the lens 15 can be adjusted by controlling the current to flow through the coil 103, so that the laser beam can be projected in the form of the predetermined spot on the storage medium fluttering vertically. The direction in which the permanent magnet is mounted can be determined at will.

In such actuator, the permanent magnet 101 is arranged in the same direction as the direction of the optical axis of the lens 15 as shown in FIG. 4, so that the leakage magnetic field Ha of the permanent magnet 101 arises in parallel with the optical axis.

The distance between the actuator and the storage medium is about 2 mm, and the value of the leakage magnetic field Ha interlinked with the storage medium is as large as approximately 100 Oe. on the storage medium. Accordingly, the leakage magnetic field of the actuator affects an external magnetic field which is applied when information is written or erased.

In the present invention, therefore, the disadvantage of the prior art as stated before is eliminated in such a way that, in the erasing mode, the leakage magnetic field is caused to act in the same direction as the direction of the erasing magnetic field $Hb_1$ when the minute part of the magnetic film 17b is heated to the temperature if its Curie point by the spot and has its magnetization reversed by a magnet coil 18. The relationship between the leakage magnetic field Ha of the actuator and the writing magnetic field Hb or erasing magnetic field $Hb_1$ established by the magnet coil 18 will be described later, and reproduction will now be explained.

In the reproducing mode, using an optical system similar to that of the writing mode, the laser beam of the laser 11 (the power of which is lower in the reproducing mode than in the writing or erasing mode) is condensed on the magnetic film 17b. Light reflected from the magnetic film 17b entails a very small rotation of the polarization plane relative to the polarization plane of the light emitted by the laser 11. The direction of the rotation (clockwise or counterclockwise) is determined by the sense of the magnetization of the magnetic film 17b. The reflected light passes through the focusing lens 15 again and is reflected by the galvano-mirror 14 as well as the semitransparent mirror 13, whereupon it is incident on a semitransparent mirror 19. Light transmitted here passes through a convex lens 20 as well as a cylindrical lens 21 and is incident on a quadri photodetector 22. A defocusing signal and a tracking signal are obtained on the basis of an output signal from the photodetector 22 (a method of deriving the defocusing signal and the tracking signal is detailed in, for example, the official gazette of Japanese Patent Application Publication No. 54-41883, which corresponds to U.S. Pat. No. 4,293,955). These control signals are feed back to a driving means (not shown) for the actuator 16 and the galvano-mirror 14.

Here will be explained the relationship between the leakage magnetic field Ha of the actuator 16 and the writing magnetic field Hb or erasing magnetic field $Hb_1$.

Figure 5:
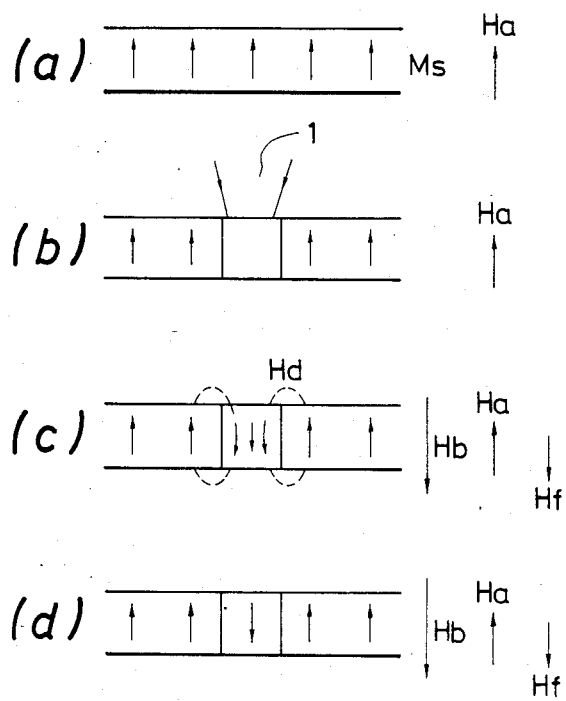
FIG. 5(a–d) and 6(a–d) are diagrams for explaining writing and erasing operations according to the present invention, respectively.

FIG. 5 is a diagram for elucidating the writing operation of the magneto-optical file memory according to the present invention.

(a) in FIG. 5 shows the magnetization Ms of the magnetic film 17b and the leakage magnetic field Ha of the actuator 16. Here, the senses of Ha and Ms are set to be the same. (b) shows a state in which the laser beam 1 is projected as the spot on the surface of the film so as to heat the minute part to the temperature of or above the Curie point. (c) shows a state resulting when the writing magnetic field Hb is applied to the state (b). An effective magnetic field Hf which is used for the actual writing is $Hf = Hb + Hd - Ha$. Accordingly, Hf decreases due to the presence of Ha in the writing mode. Since, however, Hd is added in the writing mode, Hb may be a value smaller than in the erasing mode. (d) shows a reversed magnetization state (written domain) which is stable in the cooled condition of the minute part (at the room temperature).

Figure 6:
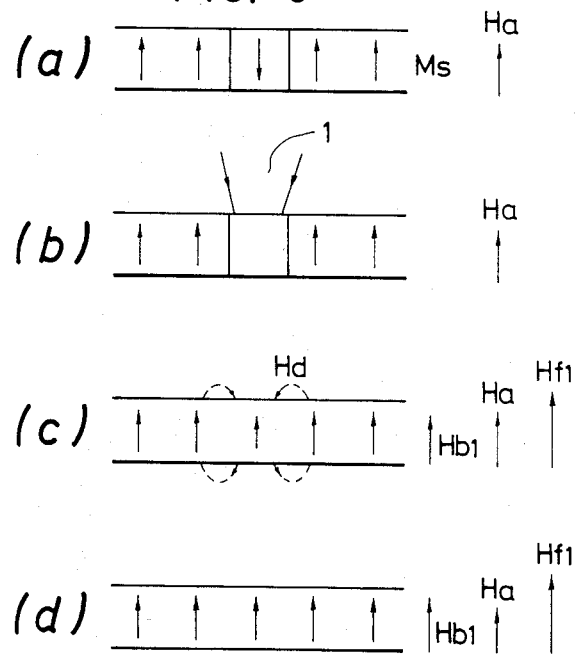

FIG. 6 is a diagram for elucidating the erasing operation according to the present invention.

(a) in FIG. 6 shows the state explained at (d) in FIG. 5. The magnetization Ms in the unwritten condition is initialized so as to have the same sense as that of Ha. (b) shows a state in which the written minute part is irradiated with the laser beam 1 in the form of the spot and is heated to the temperature of or above the Curie point. (c) shows a state in which the erasing magnetic field $Hb_1$ is applied. An actual effective erasing magnetic field $Hf_1$ is $Hf_1 = Hb_1 - Hd + Ha$. (d) shows the state of the magnetization Ms which is stable in the cooled condition of the minute part (at the room temperature).

In this manner, the erasing magnetic field Hf of great magnitude can be attained by exploiting the leakage magnetic field Ha skillfully. Since, as mentioned before, the mode of erasing information requires the magnetic field several times higher than that in the writing mode, the magnitudes of the magnetic fields to be generated by the magnet coil must be considered with reference to that in the erasing mode. According to the present invention, the leakage magnetic field is added in the erasing mode, and hence, the magnetic field to be generated by the magnet coil may be small, with the result that the magnet coil can be rendered small in size and light in weight.

Next, the aforementioned initial placement for bringing the senses of the leakage magnetic field Ha of the actuator and the magnetization Ms of the magnetic film of the storage medium into agreement will be described with reference to FIG. 7.

Figure 7:
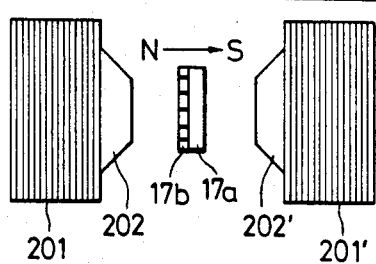
FIG. 7 is a diagram for explaining the initial placement of magnetization in a storage medium.

FIG. 7 shows an electromagnet which can generate a magnetic field on the order of 10 kOe. The electromagnet composed of coils 201, 201′ and iron cores 202, 202′. The sense of the magnetic field can be determined at will by controlling the senses of currents to flow through the coils 201, 201′.

The direction of the magnetic field is set to a fixed sense as indicated in FIG. 7, and the storage medium with the substrate 17a and the magnetic film 17b combined unitarily is inserted in this magnetic field, to set the initial magnetization so that the direction of the magnetization Ms of the magnetic film 17b may become perpendicular to the surface of the substrate.

The storage medium which has had the direction of the magnetization Ms of the magnetic film 17b thus preset is disposed so that this direction of the magnetization may agree with the direction of the leakage magnetic field Ha of the actuator, whereby the leakage magnetic field Ha can be effectively utilized in writing and erasing information as described before.

While, in the embodiment, the tracking is performed with the galvano-mirror, another expedient may of course be employed.

According to the present invention, in a magneto-optical file memory, the precise writing and erasing of information are possible, and moreover, storage domains can be made smaller to attain a higher density of storage.

What is claimed is:

1. A magneto-optical recording system comprising:
   a laser source for emitting a laser beam;
   a storage medium having a magnetic film magnetized in a first direction perpendicular to a surface of the storage medium for enabling information to be written thereon by inverting the magnetization direction of the magnetic film to a second magnetization direction opposite to the first magnetization direction;
   an optical system having an optical axis and arranged for condensing the laser beam emitted from the laser source onto the storage medium;
   actuator means for electromagnetically moving the optical system at least in a direction along the optical axis thereof for enabling the condensed laser beam to form a focal spot on the storage medium, the actuator means having a leakage magnetic field effective on the storage medium, the actuator means being arranged so that a sense of the leakage magnetic field thereof effective on the storage medium is in the same direction as the first magnetization direction of the magnetic film; and
   magnetization reversal means for reversing the magnetization direction of the magnetic film of the storage medium under irradiation of the condensed laser beam to enable information to be written on the magnetic film and erased therefrom, whereby the leakage magnetic film of the actuator means cooperates with the magnetization reversal means for enabling effective writing, and erasing of the information.

2. A magneto-optical recording system according to claim 1, wherein the magnetization reversal means provides a magnetization direction having a sense opposite to the sense of the leakage magnetic field of the actuator means for writing information.

3. A magneto-optical recording system according to claim 1, wherein the magnetization reversal means provides a magnetization direction having a sense in agreement with the sense of the leakage magnetic field of the actuator means for erasing information.

4. A magneto-optical recording system according to claim 1, wherein the magnetization reversal means provides a magnetization direction parallel to the direction of the optical axis of the optical system.

5. A magneto-optical recording system according to claim 1, wherein the actuator means includes a magnet, and a polar direction of the magnet agrees with the first magnetization direction of the magnetic film of the storage medium.

* * * * *